United States Patent
Willis (10) Patent No.: US 8,768,560 B2
(45) Date of Patent: Jul. 1, 2014

(54) METHOD AND SYSTEM FOR PERFORMING CALIBRATION OF AN ACCELEROMETER OF A TELEMATICS DEVICE DURING INSTALLATION IN A VEHICLE

(75) Inventor: Richard Ernest Willis, Surrey (CA)

(73) Assignee: Webtech Wireless Inc., Burnaby (CA)

( * ) Notice: Subject to any disclaimer, the term of this patent is extended or adjusted under 35 U.S.C. 154(b) by 170 days.

(21) Appl. No.: 13/252,928

(22) Filed: Oct. 4, 2011

(65) Prior Publication Data
US 2013/0081259 A1    Apr. 4, 2013

(51) Int. Cl.
*G07C 5/00*     (2006.01)
*G01P 21/00*    (2006.01)

(52) U.S. Cl.
CPC ....................... *G01P 21/00* (2013.01)
USPC ........ 701/29.1; 701/31.5; 701/33.1; 701/472; 702/104; 702/85; 702/95; 705/4

(58) Field of Classification Search
CPC ................. B60R 21/015; G01C 25/00; G05B 2219/2637; A61G 5/04; A61G 5/1059
USPC ........ 701/31.4, 33.2, 33.4, 445, 45, 470, 472, 701/504, 509, 510; 702/104, 141, 150; 73/1.37, 1.38, 514.37
See application file for complete search history.

(56) References Cited

U.S. PATENT DOCUMENTS

| | | | |
|---|---|---|---|
| 2002/0188392 A1* | 12/2002 | Breed et al. | 701/45 |
| 2003/0061859 A1* | 4/2003 | Rothoff | 73/1.37 |
| 2010/0102980 A1* | 4/2010 | Troy et al. | 340/686.6 |
| 2010/0192662 A1* | 8/2010 | Yanni | 73/1.38 |
| 2011/0202225 A1 | 8/2011 | Willis et al. | |
| 2012/0022780 A1* | 1/2012 | Kulik et al. | 701/220 |
| 2012/0059575 A1* | 3/2012 | Hartman et al. | 701/300 |
| 2012/0203487 A1* | 8/2012 | Johnson et al. | 702/104 |

OTHER PUBLICATIONS

STMicroelectronics. May 2011. "LSM330DL Linear sensor module," Retrieved on Sep. 28, 2011 from STMicroelectronics: http://www.st.com/internet/com/TECHNICAL_RESOURCES/TECHNICAL_LITERATURE/DATASHEET/DM00034579.pdf.

* cited by examiner

*Primary Examiner* — Helal A Algahaim
*Assistant Examiner* — Jelani Smith
(74) *Attorney, Agent, or Firm* — John Flanagan (57) ABSTRACT

A method for performing transform calibration of an accelerometer of a telematics device during installation in a vehicle includes placing the device in the vehicle at an initial position having a known alignment with a given frame of reference of the vehicle, moving the telematics device from the initial position to a final installation position in the vehicle with a tri-axial rate gyroscope of the device concurrently tracking and integrating the angle changes to provide a set of coordinates of the final installation position, and transform calibrating the accelerometer of the device using the set of coordinates so as to leave the device installed at the final position with its accelerometer transform calibrated with respect to the given frame of reference.

20 Claims, 6 Drawing Sheets

METHOD AND SYSTEM FOR PERFORMING CALIBRATION OF AN ACCELEROMETER OF A TELEMATICS DEVICE DURING INSTALLATION IN A VEHICLE

CROSS-REFERENCE TO RELATED APPLICATION

This patent application is related to co-pending patent application Ser. No. 12/656,657, filed Feb. 12, 2010 and assigned to the assignee of the present invention. The disclosure of said co-pending patent application is hereby incorporated herein by reference thereto.

TECHNICAL FIELD

The subject matter of the present invention is directed generally to alignment of a locator in a vehicle and, more particularly, is concerned with a method and system for performing transform calibration of an accelerometer of the telematics device during installation in a vehicle without requiring that the vehicle be driven.

BACKGROUND ART

An AVL or "locator" in a vehicle must undergo an alignment procedure to allow it to represent, without error, the dynamic movements of the vehicle itself, such as vehicle acceleration, forward braking, and turning maneuvers, in the vehicles Cartesian coordinate frame. More particularly, the alignment procedure must perform a transform calibration of an accelerometer in the locator.

One method of transform calibration of the accelerometer is that currently performed in accordance with the invention of the cross-referenced application after the locator is installed in the vehicle. It is done by putting the locator into a calibration state and then driving the vehicle in a prescribed manner. More particularly, this current transform calibration method involves both static and dynamic components. The dynamic component requires the vehicle to be driven on a flat surface and then braked to a stop.

Although this current method of transform calibration works satisfactory, it is time consuming. Also, it requires skill and training of personnel as well as confirmation that it worked by calling a support person at a remote service center. There is, therefore, a need for an innovation that will avoid the restrictions of aforementioned accelerometer transform calibration method.

SUMMARY OF THE INVENTION

The subject matter of the present invention provides such an innovation by enabling the performance of transform calibration of the accelerometer of a telematics device during the time the device is being installed in a vehicle while the latter is stationary. The entire accelerometer transform calibration is performed merely through physical manipulation and relocation of the telematics device during such installation. The present invention thus provides a simplified transform calibration method with local feedback to the installer regarding the success or failure of the transform calibration in that it removes the restrictions that the vehicle must be moved or be on level ground to transform calibrate the accelerometer and that a remote service technician must verify the success of the transform calibration. In other words, the present invention enables performance of the transform calibration entirely locally and along with local confirmation of the completion of a successful transform calibration.

One aspect of the present invention is a method for performing transform calibration of an accelerometer of a telematics device during installation in a vehicle. The method includes placing a telematics device in a vehicle at an initial position having a known alignment with respect to a given frame of reference of the vehicle, moving the telematics device from the initial position to a final installation position in the vehicle with the telematics device concurrently tracking and integrating the angle changes of the moving telematics device to provide a set of coordinates of the final installation position, and transform calibrating an accelerometer of the telematics device using the set of coordinates so as to leave the telematics device installed at the final position in the vehicle with its accelerometer transform calibrated with respect to the given frame of reference of the vehicle. Further, the method includes employing a tri-axial rate gyroscope in the telematics device to track and integrate the angle changes of the moving telematics device and employing a computer in the telematics device to optimize the angle changes into the set of coordinates to create a solution that is recognizable to a Euler-based transform engine in the telematics device.

Another aspect of the present invention is a system for performing calibration of an accelerometer of a telematics device during installation in a vehicle. The system includes a locator having an accelerometer capable of being transform calibrated, and a calibration tool operatively mounted with the locator to form a telematics device adapted to be moved from an initial aligned position in a vehicle to a final installation position therein. The calibration tool also is electrically coupled to the locator for supplying electrical power to the locator and transferring data from the calibration tool to the locator to facilitate transform calibration of the accelerometer in the locator. The calibration tool also is capable of concurrently tracking and integrating angle changes of the moving telematics device to provide a set of coordinates of the final installation position. More particularly, the calibration tool includes a tri-axial rate gyroscope to track and integrate the angle changes of the moving telematics device, and a computer to optimize the angle changes into the set of coordinates to create a solution that is recognizable to a Euler-based transform engine in the telematics device.

BRIEF DESCRIPTION OF THE DRAWINGS

For clarity, the drawings herein are not necessarily to scale, and have been provided as such in order to illustrate the principles of the subject matter, not to limit the invention.

DESCRIPTION OF EMBODIMENTS

Figure 1:
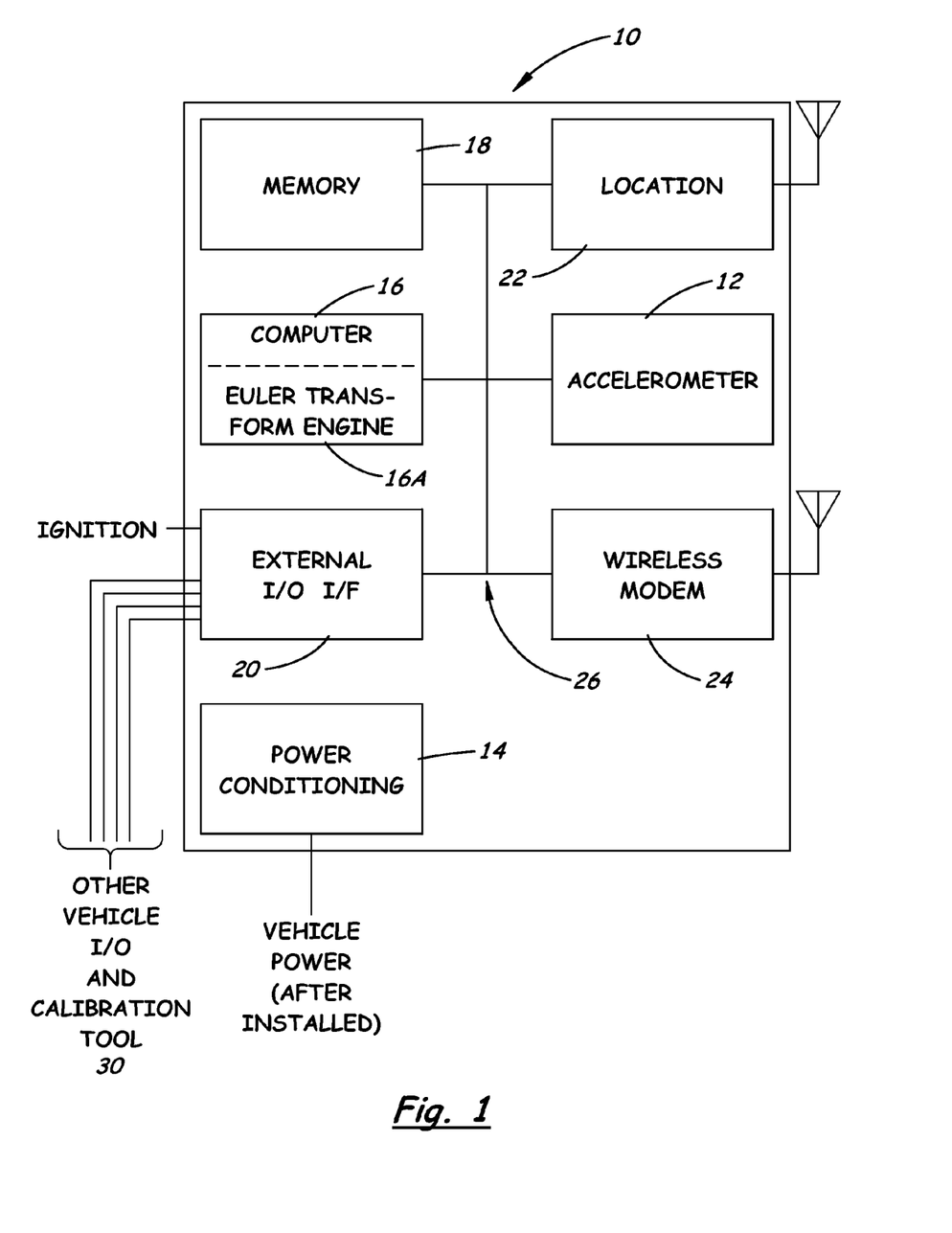
FIG. 1 is a block diagram of a vehicle locator with an accelerometer that can be transform calibrated in accordance with the present invention.
Figure 3:
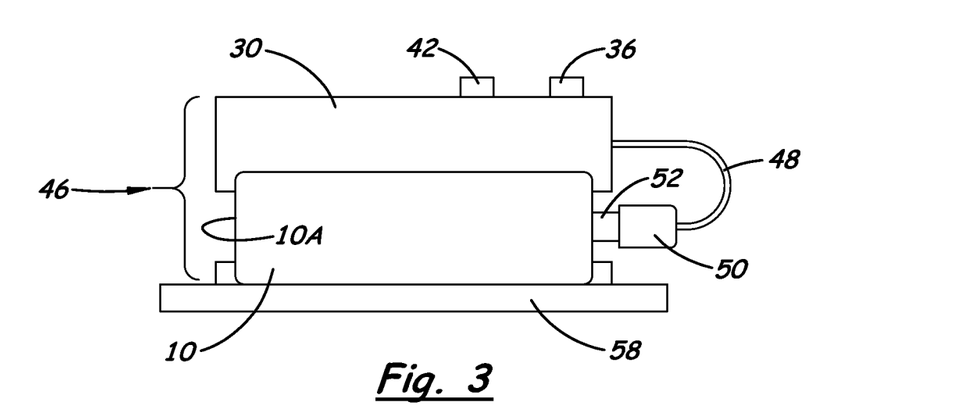
FIG. 3 is a schematic view of the locator of FIG. 1 assembled with the calibration tool of FIG. 2 to form a telematics device in accordance with the present invention.

Referring to FIG. 1, there is shown, in block diagram form, a typical locator, generally designated 10, that is installed in a vehicle V (FIG. 4) to perform a wealth of useful functions regarding the vehicle V and how it is operated. In an exemplary embodiment, the locator 10, as also described in the related cross-referenced application, includes an accelerometer 12 along with several other subsystems such as: power conditioning 14; computer 16; Euler transform engine 16A in the computer 16; memory 18; external input/output (I/O) interface 20; location (with antenna) 22; wireless modem (with antenna) 24; and internal data and power bus 26. All the aforementioned subsystems may be physically integrated into a suitable housing 28 of the locator 10, such as shown in FIG. 3.

The aforementioned subsystems provide at least the following functions and also others not mentioned herein but well-known to persons of ordinary skill in the art. Power conditioning 14 interfaces to an external power source (not shown), such as a vehicle battery, and performs various functions, such as regulating voltage levels required by the other subsystems of the device 10. Computer 16 has its own memory element, operating system and applications to perform the various well-known operational functions of the locator 10, including for example data logging and networking to external servers using the wireless modem 24. Memory 18 may be a non-volatile storage, such as flash memory, to store data and events logged by the locator 10. External I/O interface 20 provides interfaces to external digital and analog devices and technologies including those connected with the accelerometer calibration. And operation. Location 22 provides information such as the coordinates (latitude and longitude), speed, elevation, time, heading, and other geo-spatial information for the locator 10. Geo-spatial positioning information can be provided by a GPS device, as one example. The wireless modem 24 is adapted to provide a data connection between the locator 10 and a typical terrestrial or satellite based wireless network using one of a variety of wireless network standards.

The accelerometer 12 once transform calibrated in accordance with the present invention can accurately measure vehicle acceleration in one or more axes. Each axis measures the acceleration in a desired direction. Normally, the desired directions would be one of the following axes: vertical (perpendicular to the plane of the surface of the Earth); longitudinal (along the direction of travel of the vehicle), and lateral (perpendicular to the longitudinal and vertical axes). Numerous accelerometers are available that can measure acceleration in one or more axes. Ideally, measurement of accelerations in all three axes provides a complete description of the accelerations experienced by the vehicle V. An example of one accelerometer that may be employed is a Bosch Sensortec SMB380 Triaxial Acceleration Sensor. It is a three-axis (X, Y, and Z in the Cartesian reference frame) low-G acceleration device available in an integrated circuit form incorporating a three-channel Micro-Electro-Mechanical Sensing (MEMS) structure. However, there is no necessity that the accelerometer used be embodied in an integrated circuit form.

Figure 2:
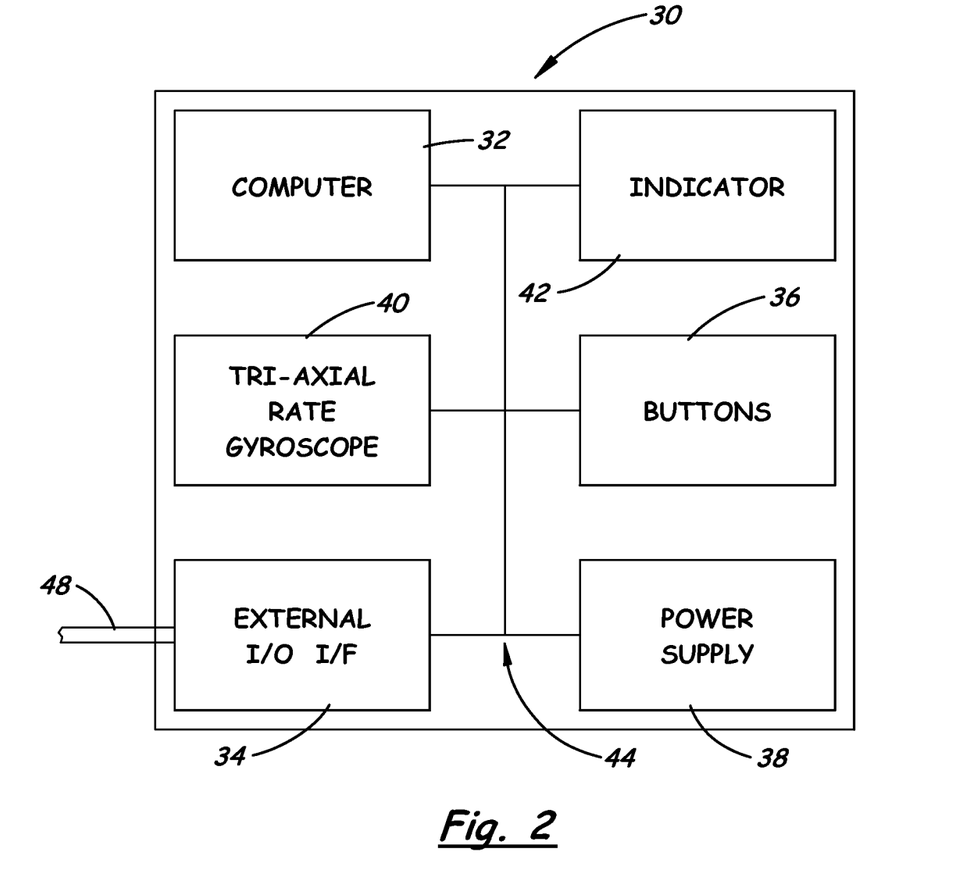
FIG. 2 is a block diagram of a calibration tool used in conjunction with the locator of FIG. 1 in accordance with the present invention.

In FIG. 2, there is shown, in block diagram form, a calibration tool, generally designated 30. The calibration tool 30 is used in conjunction with the locator 10 of FIG. 1 for performing transform calibration of the accelerometer 12 of the locator 10 in accordance with the present invention. In an exemplary embodiment, the calibration tool 30 includes the following subsystems: a computer 32, an external input/output (I/O) interface 34, one or more actuation button(s) 36, an internal power source 38 (such as a battery), a tri-axial rate gyroscope 40, an indicator 42, such as an LED and/or a buzzer, and an internal data and power bus 44. The computer 32 has its own memory element, operating system and applications to perform the various operational functions as will be described hereinafter. The external I/O interface 34 may be used for outputting data from the computer 32 as well as supplying electrical power from the power source 38 of the calibration tool 30. One or more actuation button(s) 36 when depressed will start and stop, in an alternating manner, the operation of the calibration tool 30. The tri-axial rate gyroscope 40 is operable to measure the angular velocity of the calibration tool 30, by tracking and integrating the angle of changes of the locator position, with respect to an initial reference frame. By using the original orientation of the calibration tool 30 as the initial condition and integrating the angular velocity during relocation of the calibration tool 30, the current orientation is known at all times, including orientation at the final position. An example of one tri-axial rate gyroscope that may be employed is a LSM320DL Linear Sensor Module from STMicroelectronics.

Referring to FIG. 3, there is shown, in schematic form, an exemplary embodiment of a telematics device, generally designated 46, composed of the locator 10 and the calibration tool 30 in accordance with the present invention. The telematics device 46 is formed by mounting, for example seating and attaching, the calibration tool 30 of FIG. 2 in a detachable manner upon the locator 10 of FIG. 1 such that the calibration tool 30 will move in conjunction with the locator 10 during the performance of the transform calibration of the accelerometer 12 of the locator 10. In order to render the telematics device 46 in an operational condition, an external cord 48 extending from the external I/O interface 34 of the calibration tool 30 is operatively coupled by a connector 50 thereon with a complementary connector 52 of the external I/O interface 20 of the locator 10. Through such coupling the angle changes tracked and integrated by the tri-axial rate gyroscope 40 of the calibration tool 30 are read and optimized by the computer 32 and then outputted to the locator 10 for use as a solution recognizable to a Euler-based transform engine 16A. Also, electrical power is supplied from the power source 38 of the calibration tool 30 to the locator 10 until the locator 10 for the duration of the transform calibration of the accelerometer 12 and the results are stored in non-volatile memory.

Figure 4:
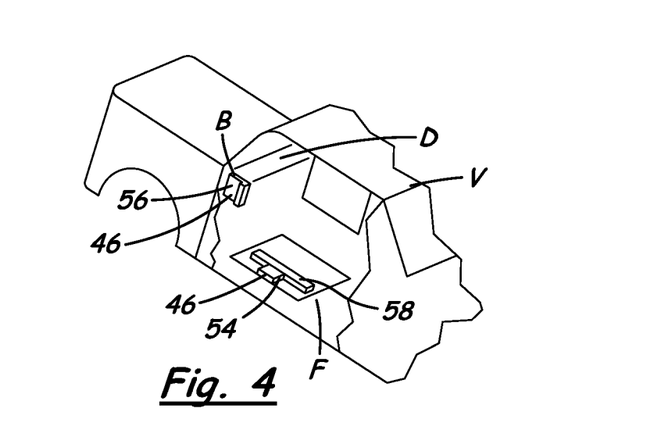
FIG. 4 is a schematic view of initial and final positions in a vehicle from and to which the telematics device of FIG. 3 is relocated in accordance with the present invention.

FIG. 4 shows an initial position 54 and a final position 56 of the telematics device 46 in the vehicle V in accordance with the present invention. The initial, or alignment start, position 54 may be located at an accessible level place on a floor F of the vehicle V for convenient placement of the calibration assembly 46. Optionally, an alignment aid 58 may be mounted to the floor F at the initial position 54 to which the telematics device 46 of the calibration assembly 46 is temporarily releasably attached to mechanically align the locator 10 with the vehicle's frame of reference, an initial (0,0,0) position of the tri-axial rate gyroscope 40. The final, or installation, position 56 of the telematics device 46 may be located at an accessible place such as on a dash area D of the vehicle V, and as such has an orientation that is initially unknown with respect to the vehicle's frame of reference.

Figure 5:
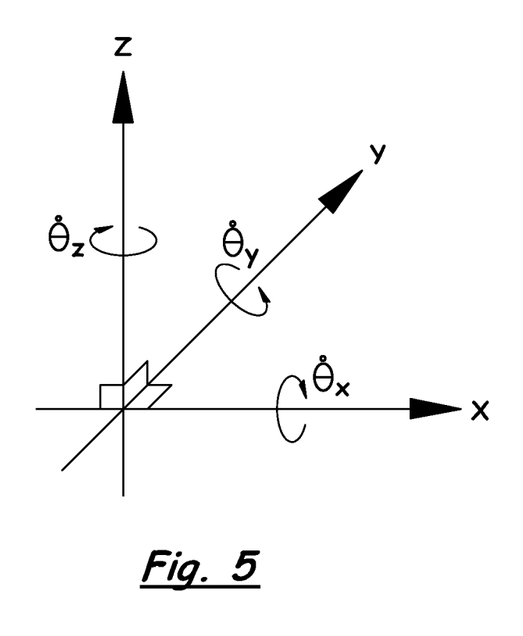
FIG. 5 is a graphical view of a tri-axial rate gyroscope of the calibration tool showing its signal outputs as the telematics device of FIG. 3 is moved from the initial position to the final position shown in FIG. 4.

FIG. 5 graphically represents the tri-axial rate gyroscope 40 with signal outputs $\theta_x$, $\theta_y$, $\theta_z$ in rad/sec. As the telematics device 46 of FIG. 3 is moved from the initial position 54 to the final position 56 as shown in FIG. 4, the calibration tool 30 tracks changes in these three signals, from zeroed state at alignment start, integrating the changes into $\Delta\theta_x$, $\Delta\theta_y$, $\Delta\theta_z$, which thus represent the angle changes between the initial and final positions 54, 56. This data is then optimized to create a solution recognizable to a Euler-based transform engine 16A to complete transform calibration of the accelerometer 12 in the locator 10. The calibration tool 30 then programs the locator 10 by issuing commands to it to transform, calibrate and save the setting. The accuracy of the transform calibration depends on the signal accuracy from the rate gyroscope 40 in the calibration tool 30 and the sampling rate during the integration of the changes in the three signals.

Figure 6:
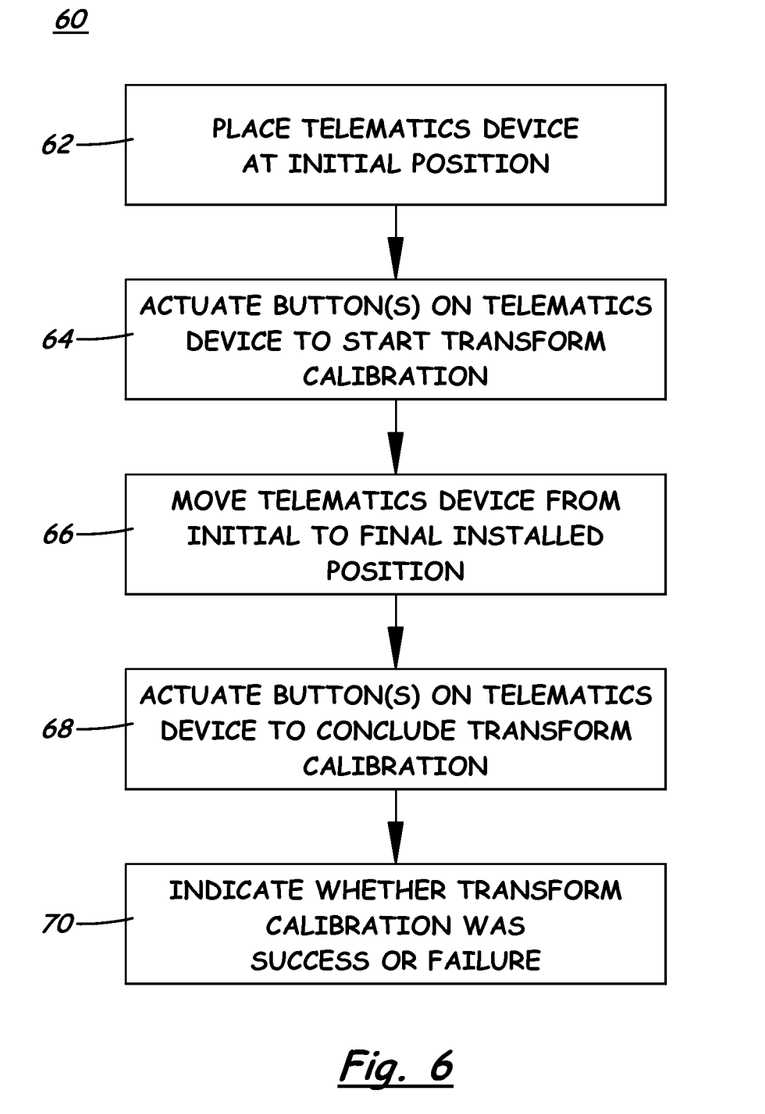
FIG. 6 is a flow diagram of the steps of the method of performing the transform calibration of the accelerometer of the locator in the telematics device in accordance with the present invention.

Referring now to FIG. 6, there is illustrated a flow diagram 60 of the steps of the method of performing the transform calibration of the accelerometer 12 of the locator 10 in accordance with the present invention. As mentioned previously, the transform calibration of the accelerometer 12 of the telematics device 10 occurs concurrently with the performance by an installer of the steps of installing the telematics device 46 and thus the locator 10 in the vehicle V in accordance with the present invention.

More particularly, as per step 62, the installer begins by placing the telematics device 46 at the initial (alignment start) position 54 such that the locator 10 is mounted and oriented flat and level with respect to the vehicle floor or alignment aid 58 with its forward face 10A pointing toward the front of the vehicle V. In regard to the exemplary embodiment of FIG. 3 where the calibration tool 30 is separate from the locator 10, it is assumed that before step 62 is performed the installer has physically and electrically connected or coupled the calibration tool 30 to the locator 10 to complete the telematics device 46 and also to supply electrical power and transfer data from the tool 30 to the locator 10 to facilitate transform calibration of the accelerometer 12. As per step 64, the installer presses the actuation button 36 on the calibration tool 30, causing it to communicate with the locator 10 to start the tracking and integrating of the angle changes by the rate gyroscope 40 of the calibration tool 30. As per step 66, the installer moves the telematics device 46 to its final (installation) position 56 in the vehicle V where the installer fastens or clips the locator 10 to a suitable mounting bracket B already installed on the vehicle V. Thus, the rate gyroscope 40 in the calibration tool 30 has concurrently tracked and integrated the angle changes relative to the initial position of the locator 10 in which it was in a level orientation with its front face 10A pointing toward the front of the vehicle V.

Upon reaching the final position 56, as per step 68, the installer then presses the button 36 again (or a second button may be provided for the purpose of) signaling that the installation procedure is complete which concludes the tracking and integrating of angle changes and optimizing thereof by the computer 32. The calibration tool 30 then transmits the installation coordinates to the locator 10, via suitable commands communicated thereto and a final command to store the calibration information to non-volatile memory is executed. As per step 70, the indicator 42 of the calibration tool 30 signals by either one or both of flashes or beeps in a prescribed fashion an indication that the transform calibration of the accelerometer 12 of the locator 10 was a success or a failure. In regard to the exemplary embodiment of FIG. 3 where the alignment tool 30 is separate from the locator 10, it is assumed that the installer dismounts or removes the calibration tool 30 from the locator 10 and completes any additional wiring and fastening required by the installation of the locator 10. It should be understood that the order of at least some of the aforementioned steps may be changed or consolidated together within the purview of the present invention.

The core of the invention is the use of the tri-axial rate gyroscope 40 to track and integrate the angle changes in the movement of the telematics device 46 and thus the locator 10 from the original flat, level, front face forward starting orientation (the initial position 52), to the final installed orientation (the final position 54). The set of angles is then optimized to provide a solution in the form of set of coordinates that is recognizable to a Euler-based transform engine 16A resident in the computer 16 of the locator 10. The calibration tool 30 transmits the set of coordinates to the locator 10 to establish what its installed orientation is with respect to gravity in both the front/back and left/right axes of the vehicle V. The set of coordinates are stored in its non-volatile memory 18 for future use.

Figure 7:
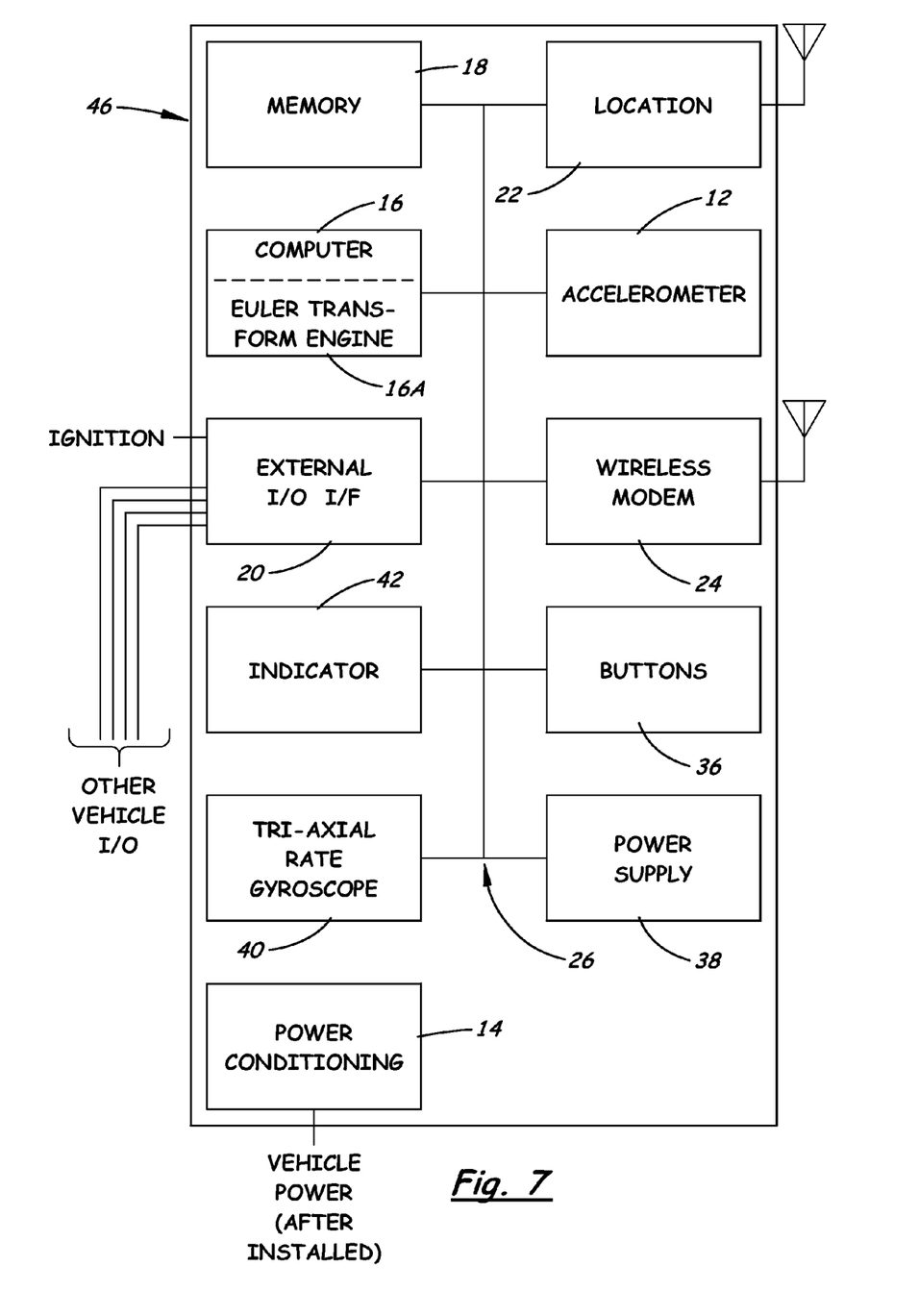
FIG. 7 is a block diagram of an alternative embodiment of the telematics device to that shown in FIG. 3 wherein the alignment tool is now incorporated in the locator.

Referring to FIG. 7, there is shown, in a block diagram, an alternative embodiment of the telematics device, generally designated 46A, to that shown in FIG. 3. Whereas in FIG. 3, the alignment tool 30 is a separate component from the locator 10, now the components of the alignment tool 30 are now incorporated in the locator 10. Therefore, now there is no mounting and dismounting of the alignment tool 30 to and from the locator 10.

In the description herein, embodiments disclosing specific details have been set forth in order to provide a thorough understanding of the invention, and not to provide limitation. However, it will be clear to one having skill in the art that other embodiments according to the present teachings are possible that are within the scope of the invention disclosed. All parameters, dimensions, materials, and configurations described herein are examples only and actual values of such depend on the specific embodiment.

What is claimed is:

1. A method for performing transform calibration of an accelerometer of a telematics device during installation in a vehicle, comprising:
    placing a telematics device in a vehicle at an initial position having a known alignment with respect to a given frame of reference of the vehicle;
    selecting a final installation position in the vehicle having an orientation initially unknown with respect to the given frame of reference of the vehicle;
    moving the telematics device from the initial position to the final installation position in the vehicle with the telematics device concurrently tracking and integrating angle changes of the moving telematics device;
    providing, from the tracking and integrating, a set of coordinates that establishes the orientation of the telematics device in the final installation position with respect to the given frame of reference of the vehicle; and
    transform calibrating an accelerometer of the telematics device using the set of coordinates so as to leave the telematics device installed at the final installation position in the vehicle with its accelerometer transform calibrated with respect to the given frame of reference of the vehicle.

2. The method of claim 1 wherein said placing the telematics device includes mounting the telematics device in a level orientation on a floor of the vehicle at the initial position.

3. The method of claim 1 further comprising operatively, mounting a calibration tool to a locator to form the telematics device, before placing the telematics device at the initial position, by physically and electrically connecting the calibration tool to the locator for supplying electrical power to the locator and transferring data from the calibration tool to the locator to facilitate transform calibration of the accelerometer.

4. The method of claim 3 wherein said calibration tool includes a tri-axial rate gyroscope to track and integrate the angle changes of the moving telematics device and a computer to optimize the angle changes into the set of coordinates to create a solution that is recognizable to a Euler-based transform engine in the telematics device.

5. The method of claim 1 wherein said telematics device includes a tri-axial rate gyroscope to track and integrate the angle changes of the moving telematics device and a computer to optimize the angle changes into the set of coordinates to create a solution that is recognizable to a Euler-based transform engine in the telematics device.

6. The method of claim 1 further comprising actuating one or more buttons on said telematics device to cause said telematics device to start tracking the movement thereof.

7. The method of claim 1 further comprising actuating one or more buttons on said telematics device after cessation of movement thereof to signal completion of the transform calibration of the accelerometer of the locator.

8. The method of claim 1 further comprising actuating an indicator on said telematics device to signal an indication that the transform calibration of the accelerometer was a success or failure.

9. A method for performing transform calibration of an accelerometer of a telematics device during installation in a vehicle, comprising:
    operatively mounting a calibration tool to a locator so as to form a telematics device therewith in which the calibration tool is physically and electrically coupled to the locator, the locator having an accelerometer;
    placing the telematics device in a level orientation on a floor of a vehicle at an initial position having a known alignment with respect to a given frame of reference of the vehicle;
    selecting a final installation position in the vehicle having an orientation initially unknown with respect to the given frame of reference of the vehicle;
    moving the telematics device from the initial position to the final installation position in the vehicle as a tri-axial rate gyroscope of the calibration tool concurrently tracks and integrates angle changes of the moving telematics device and a computer of the calibration tool optimizes the angle changes into a set of coordinates to create a solution that is recognizable to a Euler-based transform engine in the locator, wherein said set of coordinates establishes the orientation of the telematics device in the final installation position with respect to the given frame of reference of the vehicle;
    transform calibrating the accelerometer of the locator using the set of coordinates; and
    dismounting the calibration tool from the locator so as to leave the locator installed at the final installation position in the vehicle with its accelerometer transform calibrated with respect to the given frame of reference of the vehicle.

10. The method of claim 9 wherein said operatively mounting the calibration tool to the locator includes physically and electrically connecting the calibration tool to the locator for supplying electrical power to the locator and transferring data from the calibration tool to the locator to facilitate transform calibration of the accelerometer.

11. The method of claim 9 wherein said moving said telematics device is performed manually.

12. The method of claim 9 further comprising actuating one or more buttons on said calibration tool to cause the tool to communicate with the locator at the start of tracking the movement of the telematics device.

13. The method of claim 9 further comprising actuating one or more buttons on said calibration tool after cessation of movement of the telematics device to signal completion of the transform calibration of the accelerometer of the locator.

14. The method of claim 9 further comprising actuating an indicator on said calibration tool to signal an indication that the transform calibration of the accelerometer was a success or failure.

15. A system for performing transform calibration of an accelerometer of a telematics device during installation in a vehicle, comprising: a locator having an accelerometer configured for being transform calibrated; and a calibration tool operatively mounted to said locator to form a telematics device adapted to be moved from an initial position aligned with respect to a given frame of reference of a vehicle to a final installation position therein having an orientation initially unknown with respect to the given frame of reference of the vehicle; said calibration tool in said telematics device electrically coupled to said locator for supplying electrical power to said locator and transferring data from the calibration tool to said locator to facilitate transform calibration of said accelerometer in said locator; said calibration tool in said telematics device configured for concurrently tracking and integrating angle changes of the moving telematics device to provide a set of coordinates that establishes the orientation of the telematics device in the final installation position with respect to the given frame of reference of the vehicle.

16. The system of claim 15 wherein said calibration tool includes a tri-axial rate gyroscope to track and integrate the angle changes of the moving telematics device.

17. The system of claim 16 wherein said calibration tool also includes a computer to optimize the angle changes into the set of coordinates to create a solution that is recognizable to a Euler-based transform engine in the locator.

18. The system of claim 15 wherein said calibration tool includes one or more buttons actuatable to cause said calibration tool to communicate with said locator at the start of tracking the movement of said telematics device.

19. The system of claim 15 wherein said calibration tool includes one or more buttons actuatable after cessation of movement of said telematics device to signal completion of the transform calibration of said accelerometer of said locator.

20. The method of claim 15 wherein said calibration tool includes an indicator actuatable to signal an indication that the transform calibration of the accelerometer was a success or failure.

* * * * *